United States Patent [19]

Shinojima

[11] Patent Number: 5,611,304

[45] Date of Patent: Mar. 18, 1997

[54] VALVE TIMING CONTROL MECHANISM FOR INTERNAL COMBUSTION ENGINE

[75] Inventor: Masaaki Shinojima, Kariya, Japan

[73] Assignee: Nippondenso Co., Ltd., Kariya, Japan

[21] Appl. No.: 648,865

[22] Filed: May 16, 1996

Related U.S. Application Data

[63] Continuation of Ser. No. 406,105, Mar. 16, 1995, abandoned.

[30] Foreign Application Priority Data

Mar. 31, 1994 [JP] Japan ..................................... 6-063701

[51] Int. Cl.⁶ .............................................. F01L 1/34
[52] U.S. Cl. ........................................ 123/90.15; 123/90.17
[58] Field of Search ............................. 123/90.15, 90.17, 123/90.31

[56] References Cited

U.S. PATENT DOCUMENTS

| 4,811,698 | 3/1989 | Akasaka et al. ................... 123/90.17 |
| 4,856,465 | 8/1989 | Denz et al. ....................... 123/90.17 |
| 4,928,640 | 5/1990 | Van Vuuren et al. ............... 123/90.17 |
| 5,333,577 | 8/1994 | Shinojima ......................... 123/90.15 |
| 5,363,817 | 11/1994 | Ikeda et al. ...................... 123/90.17 |

FOREIGN PATENT DOCUMENTS 0445555  9/1991  European Pat. Off. .
2152193  7/1985  United Kingdom .

*Primary Examiner*—Weilun Lo
*Attorney, Agent, or Firm*—Cushman, Darby & Cushman IP Group of Pillsbury Madison & Sutro LLP

[57] ABSTRACT

The rotational phase difference between an engine crankshaft and an engine cam shaft, and a mechanism which controls the difference between the two is controlled using closed-loop feedback. The close-loop feedback has a learning function so that the rotational phase difference between the crankshaft and the cam shaft converges on a target value. The learning process uses retaining outputs based on the engine operational state to compensate the degree of actuation of the rotational phase adjusting mechanism with the value thus learned. The deviation relative to the retaining output from a map based on a variation speed at each rotational phase difference, and this deviation is added to a delay output of the feedback loop at each iteration.

14 Claims, 9 Drawing Sheets

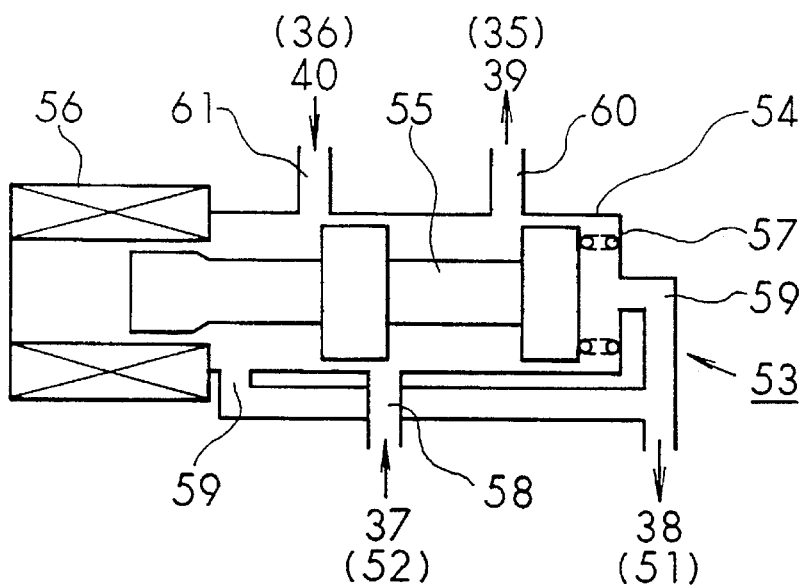
FIG. 9 (a) PRIOR ART
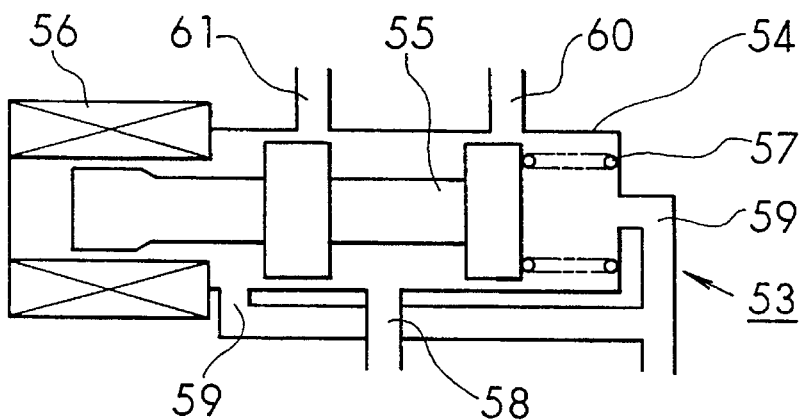
FIG. 9 (b) PRIOR ART
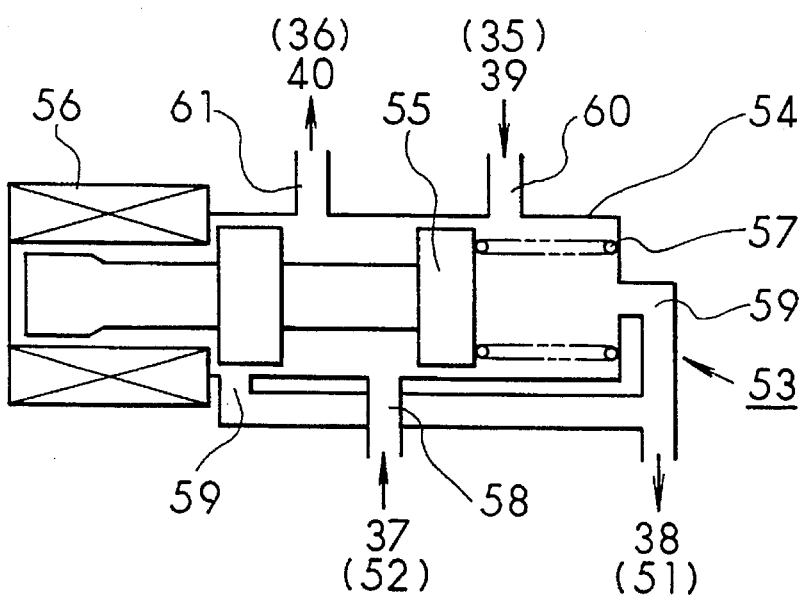
FIG. 9 (c) PRIOR ART

VALVE TIMING CONTROL MECHANISM FOR INTERNAL COMBUSTION ENGINE

This is a continuation of application Ser. No. 08/406,105, filed on Mar. 16, 1995, which was abandoned upon the filing hereof

CROSS REFERENCE TO RELATED APPLICATION

This application is based upon and claims priority of Japanese Patent Application No. 6-63701 filed Mar. 31, 1994, the content of which is incorporated herein by reference.

BACKGROUND OF THE INVENTION

1. Field of the Invention

The present invention generally relates to a valve timing control mechanism for an internal combustion engine, which controls the timing to open or close intake and/or exhaust valves of the internal combustion engine in response to the operating condition of the engine.

2. Related Art

As is well known in an internal combustion engine, crankshaft revolution is transmitted by an appropriate transmission mechanism to a cam shaft on which a cam is disposed in order to open and close an intake valve and/or exhaust valve of the engine. It is also well known that the these crankshaft and cam shaft are usually maintained at a relative angular velocity ratio of 2:1 by means of the transmission mechanism.

Here, the open or close timing of the intake valve and exhaust valve, which are set depending on the crankshaft, transmission mechanism and cam shaft, are considered to be set at an optimum timing at the rated output, for example, of the internal combustion engine. However, if the open or close timing is set fixedly like that, the timing tends to displace minutely under a low or high load operation of the engine so that such an inconvenience as a back flow of exhaust gas may occur.

FIG. 7 shows an example of a conventional valve timing control mechanism which uses a rotational phase adjusting mechanism as explained below. The mechanism of FIG. 7 is applied to a DOHC (Double Overhead Cam) type internal combustion engine and constructed as a mechanism to variably control the open or close timing of intake valves of the engine.

First of all, the DOHC type internal combustion engine 10 is so arranged that the revolution of crankshaft 11 is transmitted to each cam shaft 15 and 16 for the exhaust valve and intake valve via the transmission mechanism consisting of each sprocket for the exhaust valve and intake valve and a timing chain 14. As described previously, that these crankshaft 11 and cam shafts 15 and 16 are maintained at the rotation angular velocity of 2:1 by means of the transmission mechanism.

Further, on the mechanism of FIG. 7, a rotational phase adjusting mechanism 20 (shadowed section in the figure) is disposed between the intake valve sprocket 13 and the cam shaft 16 and the intake valve open or close timing control is executed, in accordance with an actuating amount provided by the adjusting mechanism 20 in the following manner:

(A) The cam shaft 16 is angularly advanced relative to the sprocket 13, i.e., the crankshaft 11, (B) Relative rotation angle of the sprocket 13, i.e., the crankshaft 11 and the cam shaft 16 is retained, and (C) The cam shaft 16 is angularly delayed relative to the sprocket 13, i.e., the crankshaft 11.

Here, a hydraulic mechanism 50 basically comprises an oil pan 51 which reserves working oil, an oil pump 52 which pumps the reserved working oil, and a spool valve 53 which distributes the pumped working oil to each hydraulic chamber, which is referred to later, of the rotational phase adjusting mechanism 20.

In addition, in the hydraulic mechanism 50, the working oil distribution movement by the spool valve 53 is arranged to be controlled via a linear solenoid 56. Drive of the linear solenoid 56 is controlled by a duty ratio of electric current applied by an electronic control unit 70 and the control of angular advance of the cam shaft 16 in step (A) above is realized by the duty value of the current in a direction to increase it from 50% while, on the contrary, the control of angular delay of the cam shaft 16 in step (C) is realized in a direction to reduce it from 50%.

Further, on the mechanism of FIG. 7, a crank angle sensor 17, which detects the rotational angle of the crankshaft 11, is installed near the crankshaft 11 of the internal combustion engine 10 and, similarly, a cam angle sensor 18 to detect the rotational angle of the cam shaft 16 is installed near the cam shaft 16.

Both of these angle sensors 17 and 18 are well known sensors which comprise of a plural number of bodies (lugs) subject to detection which are made of, for example, a magnetic material and an electromagnetic pickup sensor to detect the rotating passage of these detected bodies, and each of these transmits pulse signals corresponding to the rotational angle of each shaft to the control unit 70.

In this connection, the crank angle sensor 17 of the same mechanism generates four pulse signals per revolution of the crankshaft 11 while the cam angle sensor 18 generates eight pulse signals per revolution of the cam shaft 16. In other words, provided that N is the number of signals generated by the crank angle sensor 17 while the crankshaft 11 makes a single revolution, it is designed that 2N counts of signals are generated by the cam angle sensor 18 for each revolution of the cam shaft 16. Since these crankshaft 11 and cam shaft 16 are maintained at the rotational angular velocity ratio of 2:1 by means of the transmission mechanism, when it is seen from the control mechanism 70, respective signals output from these angle sensors 17 and 18 are matched angularly 1:1 to each other.

The control unit 70, therefore, measures the rotational phase difference θ between the crankshaft 11 and cam shaft 16 depending on each phase difference of signals output from these angle sensors 17 and 18 and determines the necessary amount of actuation of the rotational phase adjusting mechanism 20 via the linear solenoid 56. It should be noted that the signal number N is set as a value which satisfies the following condition where the maximum actuating amount (maximum adjustable angle) of the rotational phase adjusting mechanism 20 is θ max.°CA (crank angle): N <360° CA/θmax.°CA.

FIG. 8 shows a structural cross section of the rotational phase adjusting mechanism 20 and outline of the rotational phase adjusting mechanism 20 is explained referring also to FIG. 8.

The rotational phase adjusting mechanism 20 is built in a housing 22 which is fixed to a cylinder head 21 of an internal combustion engine.

Approximately cylindrical cam shaft sleeve 23 is mounted and fixed with a pin 24 and a bolt 25 on the end of cam shaft 16 extending from the right hand side in the figure. In addition, at the section where the sleeve 23 supports the cam shaft 16, the sprocket 13 is engaged. The sprocket 13 is prohibited form moving in the axial direction but it can slide in the rotating or circumferential direction.

On the other hand, an approximately cylindrical sprocket sleeve 26 is fixed with a pin 27 and a bolt 28 on the sprocket 13 and further an end plate 29 is fixed to the other end of the sleeve 26.

As described above, the cam shaft sleeve 23 and the cam shaft 16 as well as the sprocket sleeve 26 and the sprocket 13 are integrated to each other and each of these is rotatable in a ring plate 31 fixed with a knock pin 30 to the housing 22.

In addition, an external toothed helical spline 32a is formed at a part on a peripheral surface of the cam shaft sleeve 23 while an internal toothed helical spline 33a is formed at a part of an internal peripheral surface of the sprocket sleeve 26. A cylinder 34 is engaged between these sleeves 23 and 26 and the external toothed helical spline 32a and the internal tooth helical spline 33a are meshed respectively with an internal toothed helical spline 32b formed on the internal peripheral surface of the cylinder 34 and an external toothed helical spline 33b formed on the peripheral surface thereof.

According to the mesh of these helical splines, each sleeve 23 and 26 is integrated rotatably with the cylinder 34 so that the revolution of sprocket 13 can be transmitted to the cam shaft 16.

In addition, since these helical splines are thus meshed, if the cylinder 34 slides in the axial direction, a thrust occurs on the meshed section so that the cam shaft 16 is slid in the rotating direction. In other words, the relative rotational phase between the sprocket 13 and the cam shaft 16 changes according to the slide of the cylinder 34 in the axial direction.

In this mechanism, the hydraulic mechanism 50 is employed as a means to slide the cylinder 34. Further, a pair of hydraulic chambers 35 and 36 are provided in the rotational phase adjusting mechanism 20.

In this connection, on the rotational phase adjusting mechanism 20 according to FIG. 8, the hydraulic chamber 35 located at the left hand side in the figure is the hydraulic chamber for the advance angle motion and the hydraulic chamber 36 at the right hand side in the figure is the hydraulic chamber for the delay angle motion. In addition, the cylinder 34 slides to right or left in the axial direction depending on the quantity of the working oil supplied to each of these hydraulic chambers 35 and 37. It should be noted that oil seals are installed appropriately at each section in the area forming these hydraulic chambers 35 and 36.

Further, in the rotational phase adjusting mechanism 20, hydraulic routes 37, 38, 39 and 40 are disposed to connect the hydraulic chambers 35 and 36 and the hydraulic mechanism 50. The hydraulic route 37 among these is a hydraulic route communicating the oil pump 52 and the spool valve 53 and the hydraulic route 38 connects the spool valve 53 and the oil pan 51. In addition, the hydraulic route 39 is a hydraulic route connecting the spool valve 53 and the hydraulic chamber 35 and the hydraulic route 40 connects the spool valve 53 and the hydraulic chamber 36. Here, the hydraulic route 40 runs from a connecting route 40a in T-shape formed in a bolt 41 for securing the ring plate 31 to the housing 22, passes through an area 40b being encircled by the bolt 41 and the cam shaft sleeve 23, reaches a hydraulic route 40c formed in the sleeve 23 and further connected therefrom to the hydraulic pressure chamber 36.

FIG. 9 illustrates in (a) through (c) thereof the structure as well as ways of movement of the spool valve 53 and the movement of spool valve 53 corresponding to the duty value control by the control unit 70 is explained referring to FIG. 9.

As depicted by FIG. 9, the spool valve 53 comprises a cylinder 54, a spool 55 sliding axially in the cylinder 54 and a spring 57 which pushes the spool 55 in the direction opposite to the driving direction by the linear solenoid 56.

In addition, a working oil supply port 58 communicating with the hydraulic route 37 (oil pump 52) of rotational phase adjusting mechanism 20 and a working oil discharge port 59 communicating with the hydraulic route 38 (oil pan 51) of the adjusting mechanism 20 are formed on the cylinder 54. Further, also in the other direction of the cylinder 54, hydraulic ports 60 and 61 communicating respectively with the above mentioned hydraulic route 39 (hydraulic chamber 35) and the hydraulic route 40 (hydraulic chamber 36) of the rotation phase adjusting mechanism 20 are formed respectively. In addition, in the advance angle movement hydraulic chamber 35 and delay angle movement hydraulic chamber 36, quantity of working oil is increased or decreased depending on a continuous change in the extent of opening of each port along with the sliding of the spool 55.

Examples of typical conditions of the spool 55 are shown in FIGS. 9A–9C and the movement of the spool valve 53 is explained below.

FIG. 9A shows an example of condition of the spool valve 53 when a current having about the duty value of "100%" value is applied to the linear solenoid 56. In this occasion, the spool 55 is driven to the right end of the cylinder 54 by the linear solenoid 56 on the spool valve 53 so that the section between the working oil supply port 58 and the hydraulic port 60 and the section between the hydraulic port 61 and the working oil discharge port 59 are connected. Under this condition, working oil is supplied through the hydraulic route 37 and 39 to the advance angle movement hydraulic chamber 35 while working oil is discharged from the delay angle movement hydraulic chamber 36 through the hydraulic routes 40 and 38. Therefore, on the rotational phase adjusting mechanism 20 according to FIG. 8, the cylinder 34 is driven toward right hand side in FIG. 8 so that the phase of cam shaft 16 is advanced relative to the sprocket 13 to establish a so-called advance angle control condition.

FIG. 9B shows in (b) an example of condition of the spool valve 53 when a current having the duty ratio of approximately "50%" is applied to the linear solenoid 56 by the control unit 70. In this occasion, in the spool valve 53, the driving force of the linear solenoid 56 and the thrusting force of the spring 57 are balanced and both the hydraulic ports 60 and 61 are closed by the spool 55. In addition, in such condition, also on the rotational phase adjusting mechanism according to FIG. 8, the balance of working oil quantity is maintained theoretically at the advance angle movement hydraulic chamber 35 and the delay angle movement hydraulic chamber 36 and the phase between the sprocket 13 and the cam shaft 16 is maintained.

FIG. 9C shows in (c) an example of condition of spool valve 53 when a current having the duty ratio of approximately "10%" is applied to the linear solenoid 56 by the control unit 70. In this occasion, in the spool valve 53, the spool 55 is pushed to the left end of the cylinder 54 by the spring 57 and the section between the working oil supply port 58 and the hydraulic port 61 and the section between the above hydraulic port 60 and the discharge port 59 are communicated respectively. In addition, in such condition, working oil is supplied to the delay angle movement hydraulic chamber 36 though the hydraulic routes 37 and 40 while working oil is discharged from the advance angle movement hydraulic chamber 35 through the hydraulic routes 39 and 38. Consequently, in the rotational phase adjusting mechanism 20 according to FIG. 8, the cylinder 34 is driven to the left hand side in FIG. 8 so that the phase of cam shaft 16 is delayed relative to the sprocket 13 to establish a so-called delay or retard angle control condition.

It is to be understood that FIG. 9 shows only typical conditions of the spool valve 53 and, actually, it changes continuously from the condition of FIGS. 9A–9C depending on the duty value of the electric current applied to the linear solenoid 56.

As explained above, in the conventional valve timing control mechanism, the working oil quantity supplied to the respective hydraulic chambers 35 and 36 for the advance angle movement and the delay angle movement can be adjusted continuously through the spool valve 53 and, in the end, the valve timing of the internal combustion engine also can be controlled to desired angles.

Here, as explained above with reference to FIG. 9B, when a current of approximately "50%" duty ratio is applied to the linear solenoid 56, both the hydraulic ports 60 and 61 are surely closed on theory and the balance of respective working oil quantity is maintained on the respective hydraulic chambers 35 and 36 for the advance angle movement and the delay angle movement.

However, actually, leakage of working oil occurs between the spool valve 53 and the hydraulic routes 39 and 40. In other words, although the phase between the sprocket 13 and the cam shaft 16 is maintained by the balancing of the working oil quantity, it is unlikely that the working oil quantity supplied to the hydraulic chambers 35 and 36 through the spool valve 53 is always reduced to 0. Even if the phase is maintained between the sprocket 13 and cam shaft 16, it means only that the working oil quantity leaking from the hydraulic route 39 or 40 and that is supplied to the hydraulic route 39 or 40 are balanced by chance.

FIG. 10 shows the relation of actuating amount (drive amount) of the linear solenoid 56 and the working oil quantity supplied to the rotational phase adjusting mechanism 20 through the spool valve 53. Regions (a) through c) of FIG. 10 correspond to respective conditions of the spool valve 53 according to FIGS. 9A–9C.

The actuating amount of the linear solenoid 56 which makes 0 the working oil quantity supplied to the hydraulic routes 39 and 40, which means the actuating amount (called the retaining output hereinafter) which balances the working oil quantity leaking from the hydraulic route 39 or 40 and that is supplied to the hydraulic route 39 or 40, corresponds to the point BP in FIG. 10. Then, at this occasion, the valve timing is retained at a constant angle.

However, the working oil quantity leaking from the hydraulic route 39 or 40 varies depending on change of viscosity according to the oil temperature, change in hydraulic pressure and so forth. Further, the working oil quantity supplied to the hydraulic route 39 or 40 also changes. Therefore, the point BP corresponding to the retaining output also is not necessarily fixed at one point; rather it always changes according to the operation conditions of the relevant internal combustion engine 10. In addition, like the conventional mechanism, if the valve timing control is executed without recognizing such change in the retaining output, not only does it becomes impossible to retain the valve timing at a constant level but also the convergent accuracy of the control will become worse.

SUMMARY OF THE INVENTION

The present invention is made in the light of the foregoing drawbacks and provides a valve timing control mechanism for an internal combustion engine which realizes an accurate and highly reliable feedback control with a learning control for the valve timing, no matter what the operating conditions of the internal combustion engine may be.

According to the present invention, the rotational phase of a cam shaft relative to a crankshaft can be variably and optionally set by means of rotational phase adjusting means. In addition, the relation of the rotational angular phase thus set, that is, the actuating amount of phase adjusting means can be recurringly calculated by actuating amount operation means based on the deviation between the rotational phase difference detected by phase difference detection means and a target value and the value learned by learning means for a learning control.

The learning means is designed to learn the actuating amount of the rotational phase adjusting means, that is, the retaining output, in order to retain at a constant angle the relative rotational phase difference of the crankshaft and the cam shaft based on the actuating amount of the rotational phase adjusting means thus calculated recurringly and the variable speed of the relative rotational phase difference of the crankshaft and the cam shaft.

In the actuating amount operation means, if, for example, the deviation of the rotational phase difference between the crankshaft and cam shaft and its target value is compensated by the retaining output which is equal to the value thus learned and the actuating amount is calculated, the actuating amount thus calculated and converged through its feedback control also naturally falls in to match the value which should become the retaining output.

The learning means can be constructed to comprise, for example, (a) a delay means which delays the value of actuating amount which is calculated by the aforementioned actuating amount operating means, by the delayed response time of the control mechanism, (b) a variable speed operation means which calculates the variable speed from the change in the relative rotational phase difference of the crankshaft and the cam shaft, which is detected by the aforementioned rotational phase difference detection means, (c) an actuating amount deviation operation means to obtain the deviation of actuating amount at each occasion which is operated by the actuating amount operation means for the retaining output in response to the variable speed thus calculated, and (d) a learning operation means to execute uHS=UDL+uDC to calculate the learning value uHS, where uDL is the actuating amount which is delayed by the aforementioned delay means and uDC is the deviation of the actuating amount operated by the actuating amount deviation operation means.

Particularly, the provision of the delay means (a) allows prevention in advance of the displacement in the matching of the actuating amount calculated by the actuating amount operation means and the variation speed calculated by the variation speed operation means (b), when operating the learning value by the learning operation means (d).

In addition, at the operation of the learning value by the learning value operating means (d), because the deviation of the actuating amount obtained through the actuating amount deviation operation means (c) is used in the manner same as the operation formula, the operation amount value which should be compensated corresponding to the inherent retaining output is always taken in advance. Thus, a stable convergence in the feedback system is assured.

Notwithstanding that the retaining output thus learned varies in response to the operating condition of the relevant internal combustion engine, the change in response to the operating condition becomes negligible when the variation speed of the rotational phase difference of the crankshaft and cam shaft is small.

In addition, it is when the valve timing is converged to the target timing that the same retaining output needs to be recognized precisely, and, in such occasion, the variation speed of the rotational phase difference of the crankshaft and cam shaft is also small generally.

Therefore, with the learning means as mentioned above, a sufficient accuracy to learn the retaining output can be assured by making it as: (A) the calculation of the learning value is executed on condition that a state that the variation speed calculated by the variation speed operation means is within a specified value is maintained for a specified period of time. However, the learning value will become further reliable if the same learning means is made as: (B) the calculation of the learning value is executed on the condition that the state that the variation speed calculated by the variation speed operation means is within a specified value and the change of the actuating amount delayed by the delay means is within a specified change is maintained for a specified period of time.

BRIEF DESCRIPTION OF THE DRAWINGS

In the accompanying drawings:

FIG. 9A–9C are sketches which illustrate the structure and the way of actuating a spool valve of FIG. 7 and FIG. 8;

DETAILED DESCRIPTION OF THE PREFERRED EMBODIMENT

The present invention will be described in detail with reference to the accompanying drawings.

Figure 11:
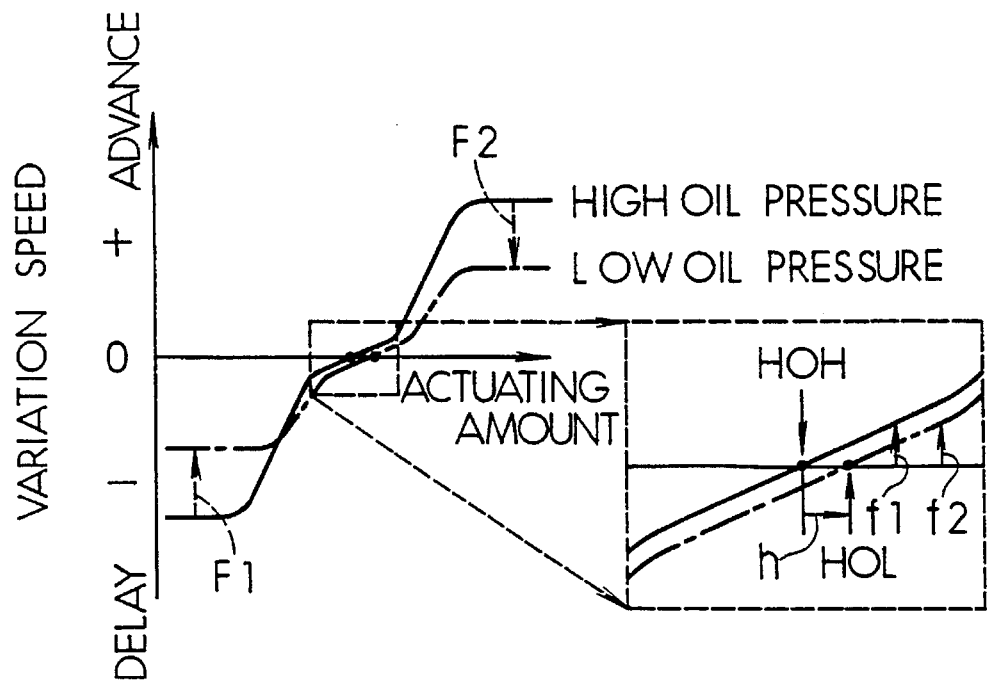
FIG. 11 is a graph which explains structural principles of the embodiment.

At first, reference is made to FIG. 11 and the structural principles of a valve timing control mechanism employed in the embodiment.

Figure 7:
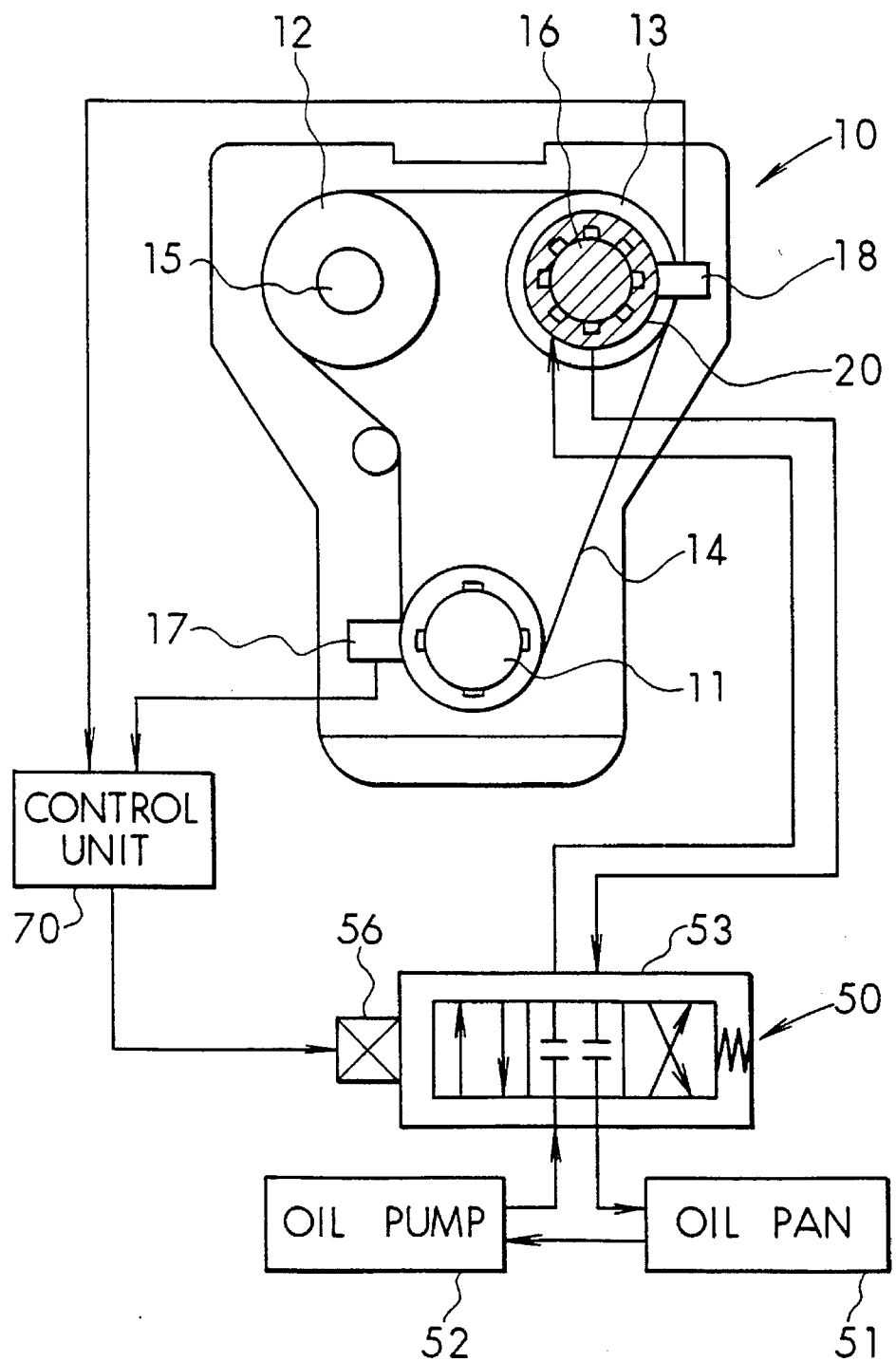
FIG. 7 is a block diagram illustrating an exemplary construction of a conventional valve timing control mechanism.
Figure 8:
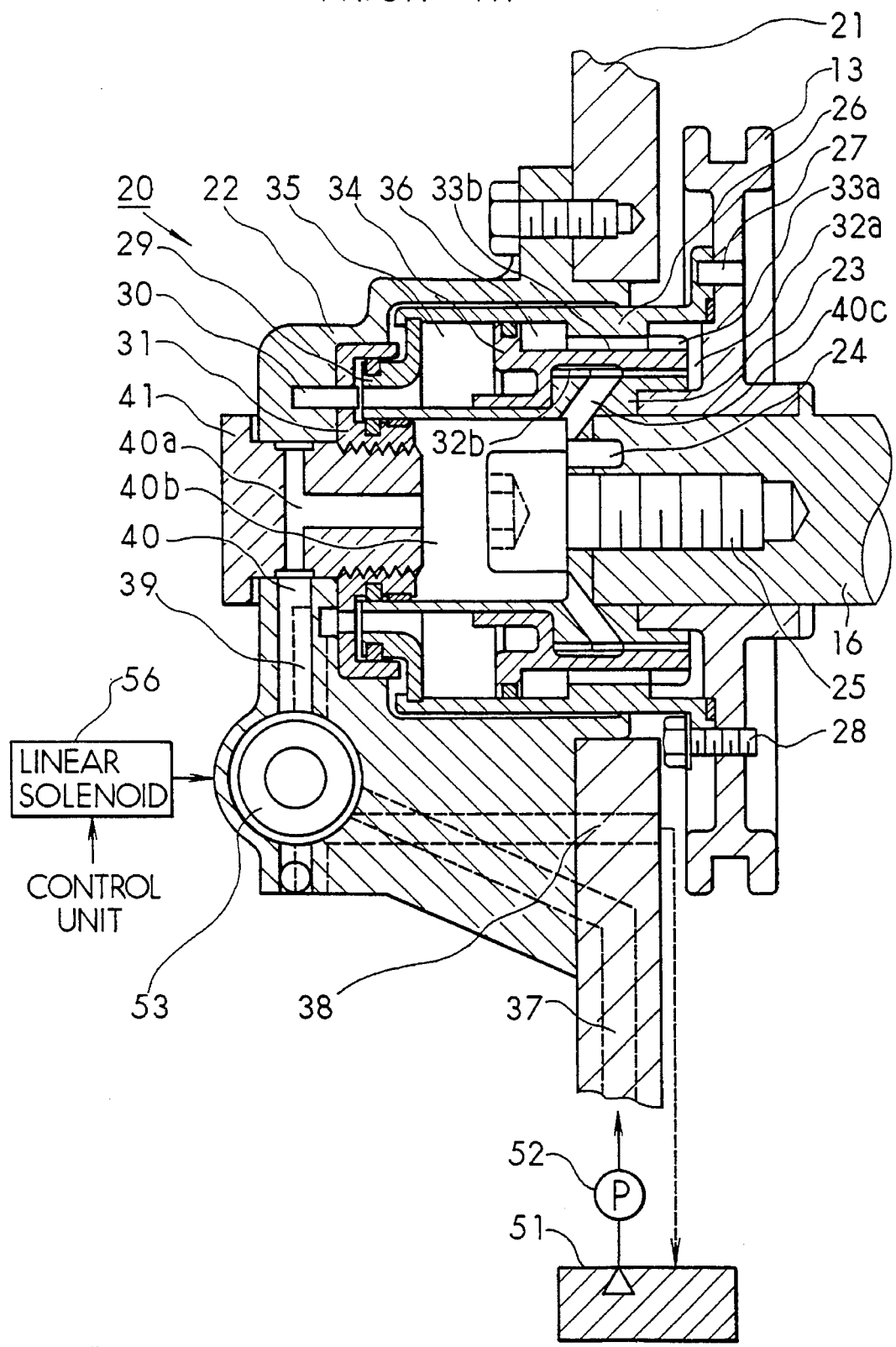
FIG. 8 is a cross sectional view of the rotational phase adjusting mechanism of FIG. 7.
Figure 10:
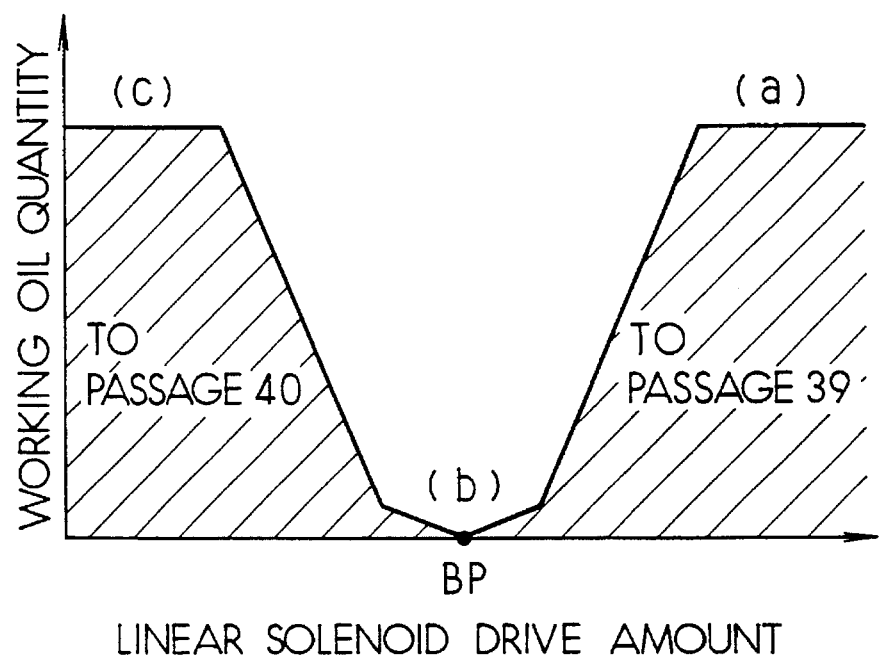
FIG. 10 is the graph illustrating a relation of the actuating amount and drive amount of a linear solenoid and the quantity of working oil supplied through the spool valve to the rotational phase adjusting mechanism.

FIG. 11 shows the effect exerted on the valve timing control by the change in pressure of the working oil which is supplied to the rotational phase adjusting mechanism 20 in a valve timing control mechanism such as the one shown in FIGS. 7 through 9, for instance.

In FIG. 11, the ordinate axis indicates the variation speed of the rotational phase difference of the crankshaft 11 and the aforementioned cam shaft 16, that is the variation speed of the valve timing and, if the same variation speed is 0, it means the state that the rotational phase adjusting mechanism 20 is retained at a constant actuating amount (adjusting amount). It applies also to the following explanation that, the rotational phase adjusting mechanism actuating amount by means of the linear solenoid 56 is called the retaining output.

In addition, when the valve timing variation speed is in the positive (+) direction, it means that the phase adjusting mechanism 20 is operated or controlled in the advance angle direction and, when it is in the negative (−) direction, it means that the rotational phase adjusting mechanism 20 is operated in the delay angle direction.

On the other hand, in FIG. 11, the abscissa axis indicates the actuating amount of the rotational phase adjusting mechanism 20 by means of the linear solenoid 56. In other words, the characteristic curve indicated by a solid line or alternate long and short dash line is the same actuating amount which makes the valve timing variation speed 0, that is, it is apparent from FIG. 11 that, taking the retaining output as the standard, if a actuating amount larger than the standard is commanded, the rotational phase adjusting mechanism 20 moves to the advance angle side while, if a smaller actuating amount is commanded, it moves to the delay angle side.

However, as the area indicated by a broken line is enlarged and shown at the right hand side of FIG. 11, when the hydraulic pressure curve indicated with an alternate long and short dash line is low, the retaining output HOL becomes larger compared with the retaining output HOH of a higher hydraulic pressure curve indicated with a solid line (H in the partial enlarged figure). In other words, the lower the hydraulic pressure, the higher retaining output is required.

It is because of following reasons:

(1) When the cam shaft 16 rotates and the cam, which is not shown, drives the intake or exhaust valve, a driving reaction force inhibit the rotational of the cam. Then, the driving reaction force works in a manner to urge a delay angle motion to the rotational phase adjusting mechanism 20. Further, at that occasion, on the same rotational phase adjusting mechanism 20, the working oil quantity leaking from the hydraulic route 39 at the advance angle side becomes larger than the working oil quantity leaking from the hydraulic route 40 at the delay angle side;

(2) Therefore, in order to maintain the rotational phase adjusting mechanism 20 at a balanced condition, it is necessary to continuously supply the working oil to the hydraulic route 39 at the advance angle side; and (3) However, because the working oil quantity supplied to the hydraulic route 39 at the advance angle side decreases along with the drop in the hydraulic pressure, a larger actuating amount is required for the retaining output.

In addition, it is learned from FIG. 11 that, when the actuating amount of the rotational phase adjusting mechanism 20 is the same, as the lower the hydraulic pressure becomes lower, the valve timing variation speed becomes smaller. This is shown in FIG. 11 as appended by the arrows F1 and F2.

However, on the other hand, it is also apparent from FIG. 11 that, in the area where the valve timing variation speed is small, that is, the area indicated with a broken line in FIG. 11, the valve timing variation speed for the actuating amount which is dislocated from the retaining output HOH or HOL, does not show much difference regardless of whether the hydraulic pressure is the high or low. This is as appended by the arrows f1 and f2 in the partial enlarged figure of the same area framed with a broken line.

According to FIG. 11, as described above, although the valve timing variation speed also changes in response to the change in the operating condition of the internal combustion engine, it is understood that such change in hydraulic pressure is almost negligible in the specified area where the valve timing variation speed is small.

Therefore, so far as the relation of the variation speed in the specified area where the valve timing variation speed is small, and the deviation of the actuating amount of the rotational phase adjusting mechanism being controlled by the feedback control compared with the retaining output is given in advance with a map or the like, the retaining output can be learned in such a manner that the value of the deviation corresponding to the variation speed at each occasion is taken in advance one after another.

Figure 1:
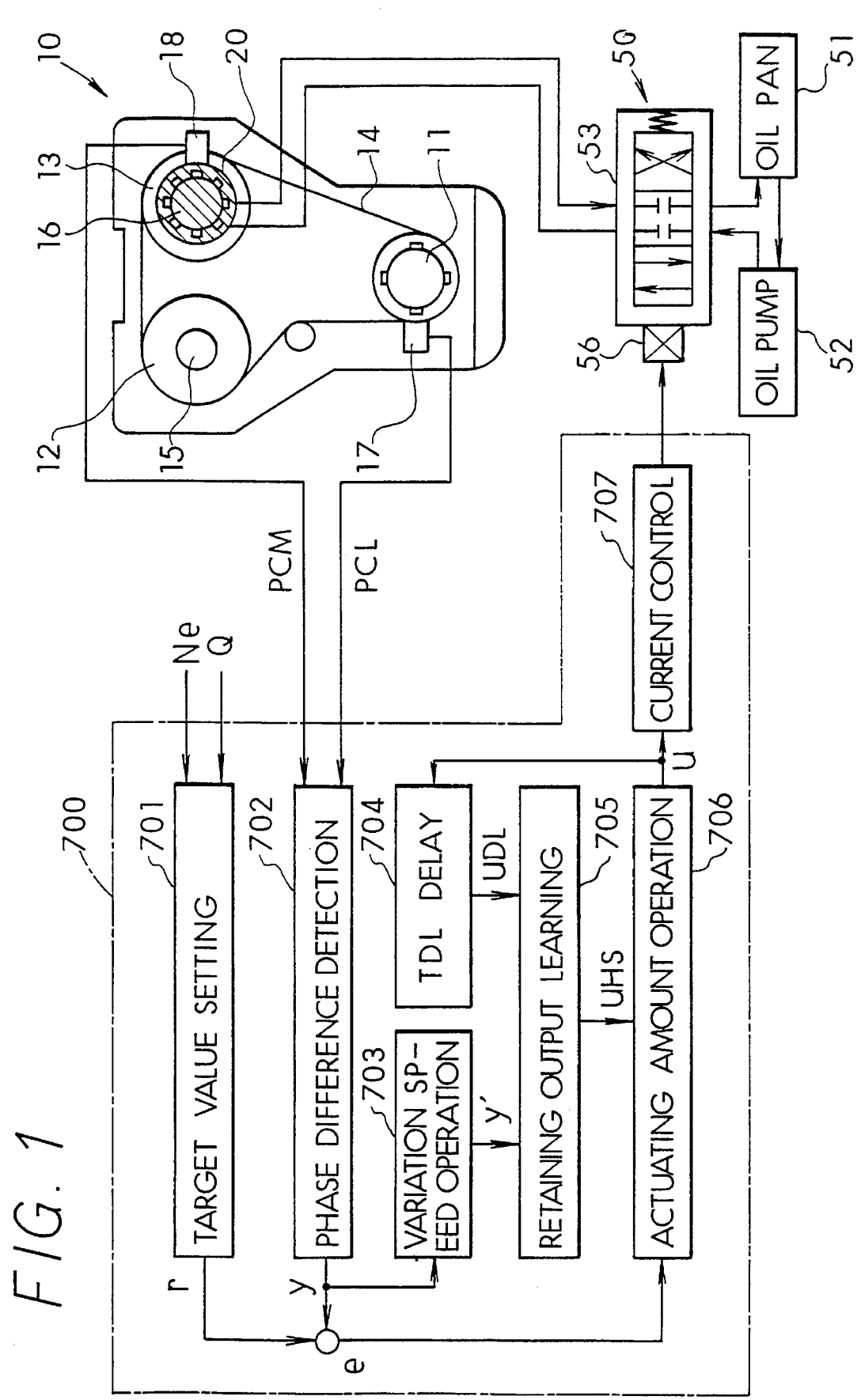
FIG. 1 is a block diagram illustrating a valve timing control mechanism for internal combustion engine according to the present invention, particularly its construction of a preferred embodiment.

FIG. 1 shows one embodiment of a valve timing control mechanism for an internal combustion engine according to the present invention, which is constructed based on the principles as described above.

In the same manner as the conventional mechanism shown in FIG. 7, the control mechanism according to the embodiment also is applied to a DOHC (Double Overhead Cam) type internal combustion engine in order to construct a mechanism that variably controls the intake valve open or close timing of the engine.

In addition, in the mechanism of the embodiment according to FIG. 1, the same reference numerals are used for the same or like elements as the component elements of the conventional mechanism shown by FIG. 7 through FIG. 9. In other words, also in the mechanism of the embodiment, including an internal combustion engine 10, a rotational phase adjusting mechanism 20, hydraulic means 50 and so forth, the same construction as those of the conventional mechanism is assumed so that duplicated explanation of these elements is abbreviated for brevity.

In the mechanism of the embodiment, an output PCL of a crank angle sensor 17 and an output PCM of a cam angle sensor 18 together with revolution speed information Ne of the engine 10, which is obtained based on an output PCL of the crank angle sensor 17, and air intake amount information Q as a load information of the engine 10 produced from an air flow meter are taken in the control mechanism 700 which comprises a microcomputer and associated electronic circuits.

The control unit 700, which is designed to control the valve timing, comprises a target value setting section 701, a rotational phase difference detection section 702, a variation speed operation or calculation section 703, a TDL delay section 704, a retaining output learning 705, an actuating amount operation section 706 and a current control circuit 707.

The function of each section of the control unit 700 as well as the detail of valve timing control being executed through these respective sections are explained hereunder.

First, the target value setting section 701 is a section where the target value r of the valve timing corresponding to the operation condition at each occasion when the internal combustion engine 10 is operated or calculated and set basically to according two kinds of information of the engine revolution speed information Ne as taken in as mentioned above and the air intake amount information Q.

Figure 2:
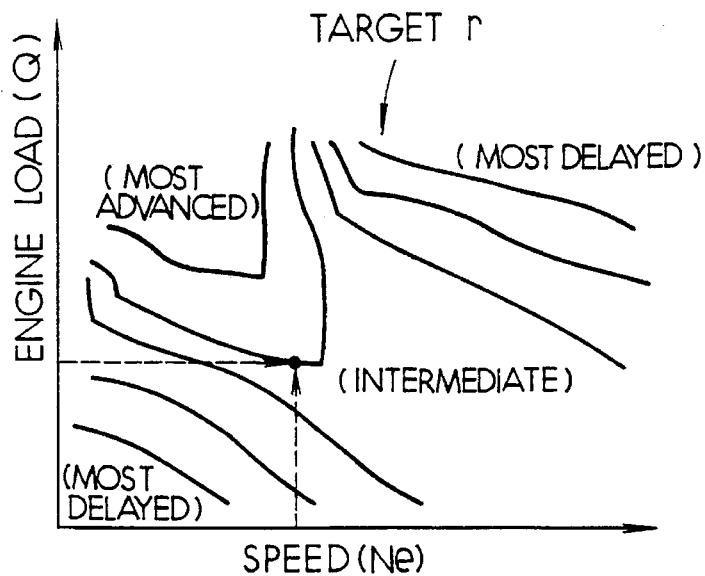
FIG. 2 is a graph illustrating an example of map used for operation of a target value, target relative turning angle, with the mechanism of the embodiment.

In other words, the target value setting section 701 has a built-in target value map (memory) as the detail thereof is shown in FIG. 2. Again in the target value setting section 701, from the relation of the two kinds of information of the revolution speed information Ne and the air intake amount information Q as taken in as mentioned above, the target value map data is searched and the valve timing target value r is operated and set.

Here, as shown by FIG. 2, the target value map is expressed as an isometric line corresponding to the area of which the angle can be adjusted by the rotational phase adjusting mechanism 20 and either one angle within such area can be obtained corresponding to the relation between the revolution speed Ne and a load (air intake amount Q).

The target value thus obtained is processed with the interpolation operation as needed.

In addition, the rotational phase difference detection section 702 is a section which detects the actual valve timing y at each occasion corresponding the rotational phase difference θ between the crankshaft 11 and cam shaft 16 based on the output PCL of crank angle sensor 17 and output PCM of cam angle sensor 18.

The actual valve timing y thus detected is entered in the actuating amount operation section 706 as the deviation e compared with the target value r obtained as mentioned above. In addition, the detected valve timing y is also given to the variation speed operation section 703 in which a differential value, that is the variation speed y', is operated.

In other words, the variation speed operation section 703 is constructed as a differential circuit of the actual valve timing y and, for example, in a mechanism controlling the valve timing by the digital processing like the case of the control unit 700, the variation speed y' is operated as follows:

$$y' = (yi-1) - (yi)$$

Where, i: control cycles yi−1: previous valve timing yi : present valve timing.

The variation speed y' thus operated, together with the value uDL which is the actuating amount u at each occasion for the rotational phase adjusting mechanism 20 delayed by the time TDL by the TDL delay section 704, is given to the retaining output learning section 705. The time TDL is a time which summarizes the delay all over the feedback system which includes the response delay of the hydraulic mechanism 50, the response delay of the rotational phase adjusting mechanism 20 and so forth. The delay processing like this over the time TDL allows the system to preferably absorb the displacement in the matching of the actuating amount u at each occasion and the resulting valve timing variation speed y'.

Retaining output learning section 705 is a part where the retaining output corresponding to the variation speed y' at each occasion is learned based on the given valve timing variation speed y' and delayed actuating amount uDL. In addition, the way of learning is in accordance with the principles of the embodiment as explained previously.

Figure 3:
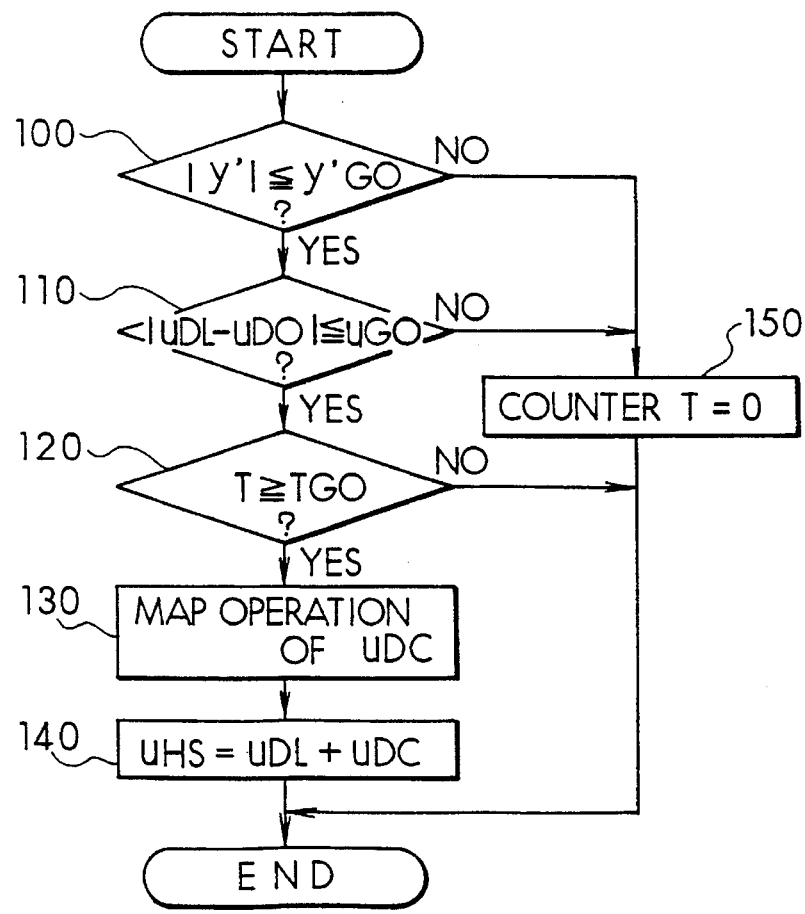
FIG. 3 is a flow chart illustrating procedures to learn a retaining output of the mechanism of the embodiment.

FIG. 3 shows the processing procedure of the learning process being executed in the retaining output learning section 705 and here the way of learning is explained also referring to FIG. 3. It is to be noted that the learning process by the retaining output learning section 705 is executed repeatedly with a frequency of, e.g., 3 through to 15 milliseconds.

Now, provided that the variation speed y' and the delayed actuating amount uDL are given respectively, the learning process concerning the retaining output with the retaining output learning section 705 is executed as explained below.

(1) On conditions that the absolute value |y'| of the valve timing variation speed y' is smaller than the specified value y' GO of the variation speed (Step 100) and the absolute value |uDL−uDO| of the size of change of delayed actuating amount uDL is smaller than the specified value uGO of the size of change (Step 110), the duration is checked (Step 120). Here, the specified value y' GO of the variation speed means the value which corresponds to the boundary value of the specified area where the valve timing variation speed, for example, as shown in FIG. 11 as the area in the broken line, is small. In addition, the value uDO used to obtain the change of the actuating amount uDL is equal to the value uDL which is smoothed or averaged, and, for example, an average value as shown below is used:

$$uDO=\{(uDLi)+(uDLi-1)\}/2$$

Where, i: control cycles uDLi : present delayed actuating amount uDL uDLi−1: previous delayed actuating amount uDL.

In addition, a value from which a period of time when the actuating amount for the rotational phase adjusting mechanism 20 such as the early stage of start of valve timing change and the like, is excluded, is selected for the specified value uGO of the change. To check the duration, the counter T built in the retaining output learning section 705 is used. The counter T counts automatically the time lapsed after a reset. During the check of the duration, if the value counted by the counter T does not reach the counted value TGO corresponding to the specified duration, the process temporarily exits from the learning process and, when the value counted by the counter T reaches the specified duration, the process is transferred to the next operation process (Step 130). In this connection, when all of these conditions are met, it is assured also that the valve timing control is within the area indicated by the broken line in FIG. 11.

Figure 4:
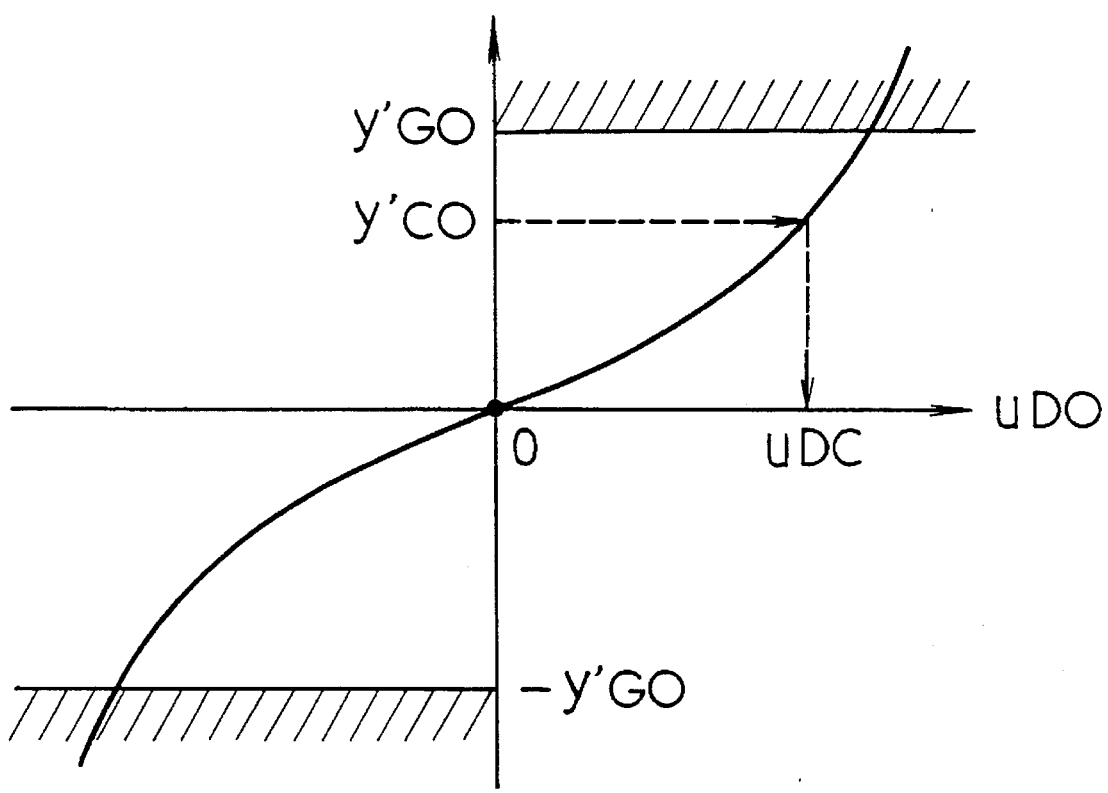
FIG. 4 is a graph illustrating an example of a map concerning a relation between a current variation speed of valve timing used for the learning process of the retaining output of FIG. 3 and a deviation relative to the retaining output of actuating amount of rotational phase adjusting mechanism controlled by a feedback control.

(2) At the step 130, the deviation of the actuating amount at each occasion of the rotational phase adjusting mechanism 20 and the retaining output is operated based on the map of which an example is shown in FIG. 4. The map shows the relation of the deviation of the variation speed relative to the retaining output of the actuating amount, and the relation like this, in a manner corresponding to the characteristic in the area indicated by the broken line in FIG. 11, needs to be registered or stored in advance in the memory. Further, at the map operation, as shown by FIG. 4, from the value of the present valve timing variation speed y'CO in the specified area, the deviation uDC of the present actuating amount corresponding to it relative to the retaining output is obtained. The part on which the map operation process is executed, constitutes the actuating amount deviation operation section of the retaining output learning section 705.

(3) After obtaining the deviation uDC relative to the current actuating amount relative to the retaining output, the retaining output learning section 705 finally executes the following operation, based on the relayed actuating amount uDL given by the TDL delay section 704 relative to the retaining output, to calculate the learning value uHS (Step 140), $$uHS=uDL+uDC.$$

The learning value uHS thus calculated is output to the actuating amount operation section 706. By the way, the part executing the operation of learning value uHS constitutes the learning value operation section of the retaining output learning section 705.

In addition, the counter T is reset (T=0) and the process temporarily exits the learning process, if the following conditions are not met during the process (1):

Absolute value |y'| of the valve timing variation speed y' is smaller than the value y'GO specified to the variation speed (Step 100), and Absolute value |uDL−uDO|of the change of the delayed actuating amount uDL is smaller than the value specified to the change (Step 110).

In the mechanism of the embodiment, according to FIG. 1, the actuating amount operation section 706 is a part which executes the PD (proportional, differential) control based on the deviation e of the valve timing y detected as mentioned above relative to the target value r and the learned learning value uHS and determines the actuating amount u at each occasion of the rotational phase adjusting mechanism 20.

That is, in the actuating amount operation section 700, where Kp is the control gain relevant to the proportional control and Kd is the control gain relevant to the differential control, based on the deviation e and the learning value uHS, executes following operation and determines the actuating amount u, u=Kp×e +Kd×e'+uHS.

The operation control process of the actuating amount u is repeatedly executed at a cycle of 3 to 15 milliseconds just like the learning process as described above. In the operation formula, the value e' is a differential value and, when controlling the valve timing by the digital process, it is also a value having the following contents:

$$e'=(ei-1)-(ei)$$

Where, i : control cycles ei−1: previous deviation e ei : present deviation e

The actuating amount u thus determined is given to the current control circuit 707 where it is converted to a current signal having the specified duty value to drive and control the linear solenoid 56.

FIGS. 5–5E and FIGS. 6A–6E show the results of experiments conducted to confirm the effect of the mechanism of the embodiment as mentioned above and the contents of such experiment as well as the effect brought about by the mechanism of the embodiment are described hereunder also referring to FIGS. 5A–5E and FIGS. 6A–6E.

Figure 5:
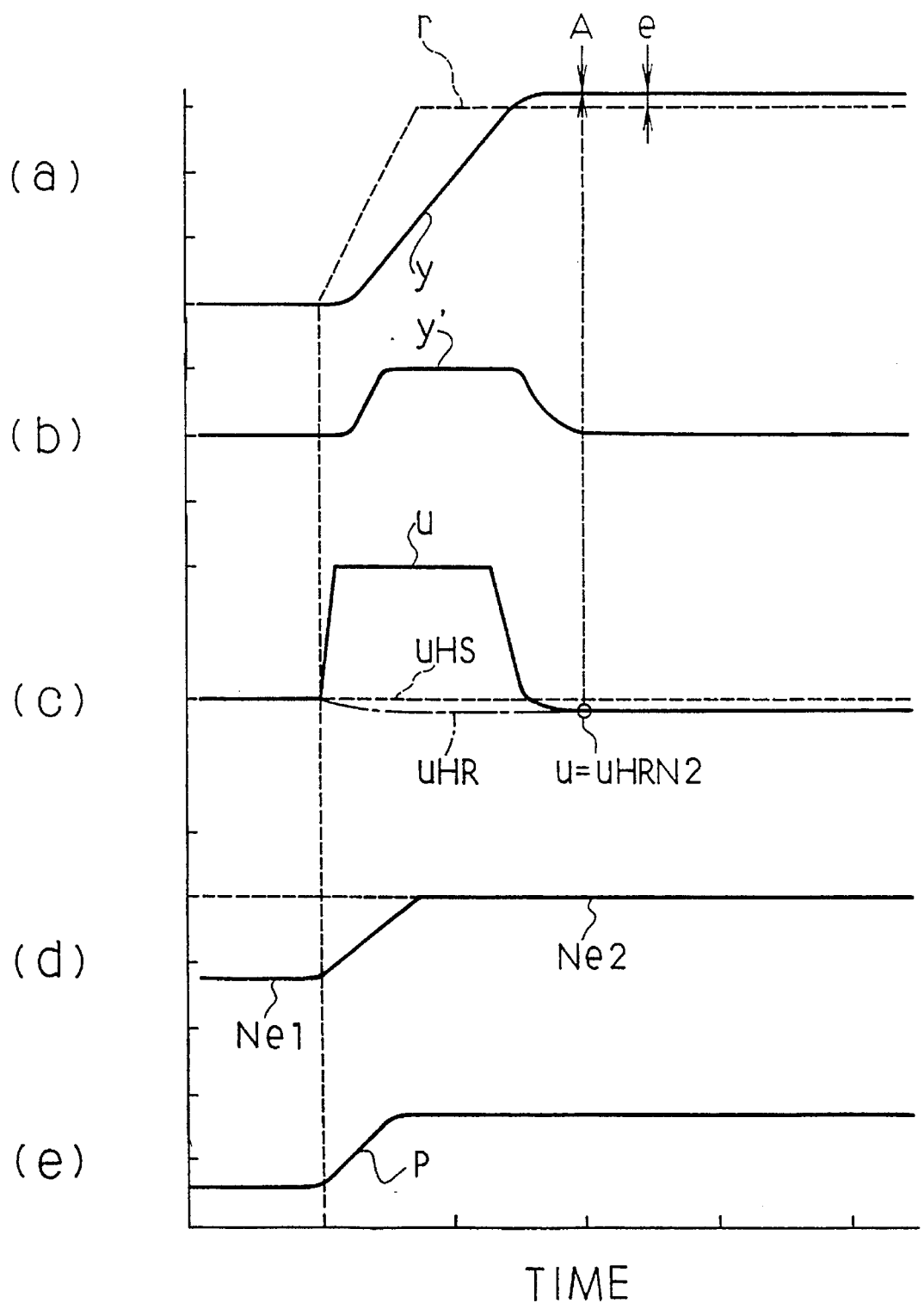
FIG. 5 is a timing chart illustrating a way of timing which occurs when a learning value of retaining output is unchanged relative to a change in revolution speed of the internal combustion engine.
Figure 6:
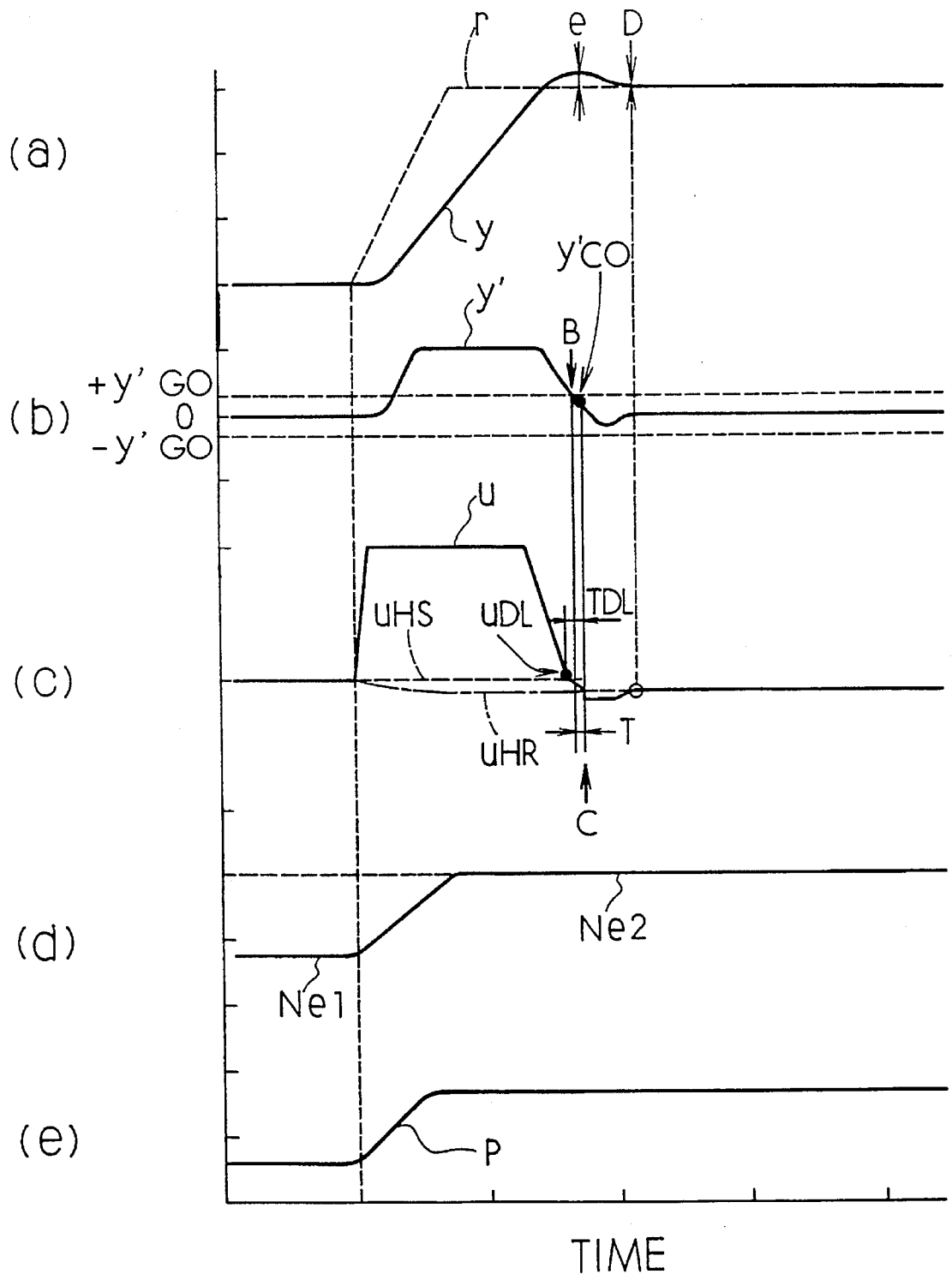
FIG. 6 is a timing chart illustrating the way of timing which occurs when the retaining output is learned at each occasion in accordance with the change in revolution speed of the internal combustion engine.

As shown by (d) of FIG. 5 or (d) of FIG. 6, the revolution speed Ne of the internal combustion engine 10 was raised gradually and, when it reached the revolution speed Ne2, the revolution speed Ne was maintained. As shown by FIG. 5E or FIG. 6E, the discharge pressure P of the oil pump 52 rose along with the rise of the revolution speed Ne.

At this occasion, on the other hand, the actual retaining output (inherent retaining output) uHR went down contrary to the oil pump 52. The manner of change of the actual retaining output uHR is indicated with the alternate long and short dash line in FIG. 5C or FIG. 6C. Here, the relation between the discharge pressure P of the oil pump 52 and the actual retaining output uHR agreed with the relation as shown by FIG. 11.

In addition, the actual retaining output uHR is designated for convenience as uHRN1 for the revolution speed Ne1, and the actual retaining output is designated as uHRN2 for the revolution speed Ne2. Immediately after the start of experiment, the learning value uHS relevant to the retaining output took the correct value for the revolution speed Ne1 and the relationship uHS=uHRN1 was established. At the occasion, the target value r of the valve timing and the valve timing y actually detected are matched by the feedback control of the mechanism.

Later, as the revolution speed Ne was raised as mentioned above, the target value r gradually changed toward the advance angle side along with the rise of the revolution speed Ne and, when it reached the revolution speed Ne2, it was maintained at the constant level. Transition of the target value r is indicated with a broken line in FIG. 5A or FIG. 6A.

In this experiment, further, the convergence of the actual valve timing y at the revolution speed Ne2 was evaluated while the target value r was changing. FIGS. 5A–5E show the transition of the valve timing y when the learning value relevant to the retaining output was fixed at a constant value against the change in the revolution speed of the internal combustion engine 10, that is, the learning has not been performed.

As shown by FIG. C5, the actual retaining output uHR and the learning value uHS (constant) produced the difference therebetween along with the rise of the revolution speed Ne. In this period, from the actuating amount operation section 706, the actuating amount u was output as u=Kp×e +Kd×e'+uHS (=uHRN), and, when the actuating amount u turned to the following value after it reached the revolution speed Ne2, u=uHRN2, the actual valve timing y became constant as shown by FIG. 5A.

In this case, since the differential value e' of the deviation e is 0 subsequent to the point A as appended in (a) of FIG. 5, the actuating amount u also turned to u=Kp×e+uHRN1, and the valve timing y, while leaving the deviation e equals to, Kp×e=uHRN2−uHRN1 became maintained at a constant value. It does not mean that a precise feedback control concerning the valve timing has been executed. Such situation, as it is, applies also to any conventional mechanisms which do not learn the retaining output.

On the other hand, FIGS. 6A–6E show an example of the valve timing control according to the mechanism with the learning control and shows the transition of the valve timing y when the retaining output has been learned successively corresponding to the change in the revolution speed of the internal combustion engine 10.

As it is shown by FIG. 6C, the difference between the actual retaining output uHR and the learning value uHS was produced along with the rise of the revolution speed Ne as well in this case, however, when it reached the point B appended in FIG. 6B, the condition mentioned previously about the variation speed, that is, |y'|≦y' GO was satisfied in this case, further at the point C appended in FIG. 6C, the following condition concerning the duration, T≧TGO, was also satisfied and the learning concerning the actual retaining output uHR was executed. It is same as described above that the learning was executed based on the actuating amount uDL delayed by the time TDL and the actuating amount deviation uDC processed by the mapping operation according to the variation speed y'CO at the point by uHS=uDL+uDC.

Further, if the learning value uHS and the actual retaining output uHR become equal as the result of the learning FIG. 6C, the deviation e converged to 0 at the point D shown in FIG. 6A according to the feedback control of the mechanism.

As it has been described above, according to the control mechanism of the embodiment, the deviation e can be converged accurately to 0 by the learning of the retaining output so that the valve timing of internal combustion engine can be controlled highly accurately by the feedback with learning.

In addition, if the target value r of the valve timing changes corresponding to the operating condition of the internal combustion engine 10, the variation speed y' and the actuating amount u also change generally. Therefore, if the learning is executed under such conditions, it may be considered that the error of the learning value changes to the contrary.

Therefore, with the control mechanism of the embodiment, as it is shown as the processes of the steps 100 through 120, the learning is designed to be executed on the following conditions that the state that the variation speed y' is within the specified value y'GO continues for a specified period of time, and that the state that the change of delayed actuating amount uDL is within the specified change continues for a specified period of time. Therefore, according to the mechanism of the embodiment, the learning value can be obtained as a highly reliable value.

It should be noted, however, that it becomes necessary to grasp accurately the retaining output when the valve timing is converged to the target timing, and in such case the variation change y' of the valve timing usually also becomes smaller. Therefore, regarding the conditions to execute the learning, it is sufficient if only the following condition is satisfied that the state that the variation speed y' is within the specified value y'GO is maintained for a specified period time.

In addition, the types of internal combustion engine to which the valve timing control mechanism according to the present invention is applied, are not limited to the DOHC type only. The valve timing control mechanism can be applied to any other types of internal combustion engine in the same or like manner as in the embodiment.

Further, the cam shaft to which the rotational phase adjusting mechanism and the cam angle sensors are disposed, also is not limited to the cam shaft for the intake valve. The rotational phase adjusting mechanism and cam angle sensor can be disposed on the cam shaft of the exhaust valve as well in the same way as mentioned above.

Furthermore, the rotational phase adjusting mechanism is not limited to the construction as shown by FIG. 8 and it can be designed differently therefrom. So far as it has a mechanism which allows it to continuously adjust the relative rotational phase between the crankshaft and the cam shaft by hydraulic means, any other kinds of construction can be employed as the rotational phase adjusting means of the control mechanism.

As it has been explained in the foregoing, in the present invention, the retaining output is learned based on the actuating amount of the rotational phase adjusting mechanism, which is calculated recurringly, and the variation speed at each occasion of the valve timing, and the actuating amount at each occasion of the rotational phase adjusting mechanism is calculated and determined based on the deviation of the actual valve timing relative to the target value as well as the learning value.

As a result, the deviation of the valve timing relative to the target value can be converged accurately to 0 based on the value of inherent retaining output which is obtained by the learning. In other words, the valve timing of an internal combustion engine can be controlled by the feedback including learning with a high accuracy.

The present invention has been described with reference to the embodiment which is considered prefeferred presently. It should be understood, however, that the present invention is not limited thereto but may be modified in many ways without departing from the spirit of the invention.

What is claimed is:

1. A valve timing control mechanism for an internal combustion engine comprising:

transmission means for transmitting revolutions of a crankshaft of an internal combustion engine to a cam shaft on which a cam is disposed in order to open and close at least one of an intake valve and an exhaust valve of said engine;

rotational phase adjusting means interposed in said transmission means and for adjusting a rotational phase between said crankshaft and said cam shaft;

a crank angle sensor disposed on said crankshaft and detecting a rotational angle thereof;

a cam angle sensor disposed on said cam shaft and detecting a rotational angle thereof;

rotational phase difference detection means for detecting an actual relative rotational phase difference between said crankshaft and said cam shaft based on detected outputs of said sensors;

actuating amount operation means calculating an actuating amount of said rotational phase adjusting means to make said detected rotational phase difference equal to a target value; and learning means for learning, based on said actuating amount thus calculated and a variation speed representative of a rate of change of said relative rotational phase difference between said crankshaft and said cam shaft, a learned value which is an actuating amount of said rotational phase adjusting means required for retaining said relative rotational phase difference at a constant level of relative rotational phase difference, said actuating amount operation means calculating and determining said actuating amount of said rotational phase adjusting means at each occasion based on a difference between said detected rotational phase difference the target value and said learned value.

2. A valve timing control mechanism for an internal combustion engine comprising:

transmission means for transmitting revolutions of a crankshaft of an internal combustion engine to a cam shaft on which a cam is disposed in order to open and close at least one of an intake valve and an exhaust valve of said engine;

rotational phase adjusting means interposed in said transmission means and adjusting a rotational phase between said crankshaft and said cam shaft;

a crank angle sensor disposed on said crankshaft and detecting a rotation angle thereof;

a cam angle sensor disposed on said cam shaft and detecting a rotation angle thereof;

rotational phase difference detection means for detecting an actual relative rotational phase difference between said crankshaft and said cam shaft based on detected outputs of said sensors;

actuating amount operation means calculating an actuating amount of said rotational phase adjusting means to make said detected rotational phase difference equal to a target value; and learning means for learning, based on said actuating amount thus calculated and a variation speed representative of a rate of change of said relative rotational phase difference between said crankshaft and said cam shaft, a learned value which is an actuating amount of said rotational phase adjusting means required for retaining said relative rotational phase difference at a constant level of relative rotational phase difference, said actuating amount operation means calculating and determining said actuating amount of said rotational phase adjusting means at each occasion based on a difference between said detected rotational phase difference and said target value and said learned value;

wherein said learning means includes delay means delaying a value of said actuating amount calculated by said actuating amount operation means by a delayed time of response of said control mechanism;

variation speed operation means calculating said variation speed from a change in the relative rotational phase difference which is detected by said rotational phase difference detection means;

actuating amount deviation operation means calculating a deviation of actuating amount at each occasion which is calculated by said actuating amount operation means relative to the actuating amount provided to said rotational phase adjusting means which is designed to retain at a constant level a relative rotational phase difference between said crankshaft and said cam shaft according to said variation speed thus calculated; and learning value operation means executing an operation of uHs=uDL+uDC and calculating a learning value uHs, where uDL is an actuating amount delayed by said delay means and uDC is a deviation of actuating amount calculated by said actuating amount deviation operation means.

3. A valve timing control mechanism for an internal combustion engine according to claim 2, wherein said leaning means executes a calculation of said learning value on condition that the variation speed calculated by said variation speed operation means is within a specified value.

4. A valve timing control mechanism for an internal combustion engine according to claim 2, wherein said learning means executes the calculation of said learning value on conditions that the variation speed calculated by said variation speed operation means is within a specified value and a state that a variation of the actuating amount delayed by said delay means is within a specified change is maintained for a specified time.

5. A valve timing control mechanism for an internal combustion engine comprising:

transmission means for transmitting revolutions of a crankshaft of an internal combustion engine to a cam shaft on which a cam is disposed in order to open and close at least one of an intake valve and an exhaust valve of said engine;

rotational phase adjusting means interposed in said transmission means and adjusting a rotational phase between said crankshaft and said cam shaft;

a crank angle sensor disposed on said crankshaft and detecting a rotational angle thereof;

a cam angle sensor disposed on said cam shaft and detecting a rotational angle thereof;

rotational phase difference detection means for detecting an actual relative rotational phase difference between said crankshaft and said cam shaft based on detected outputs of said sensors;

actuating amount computation means for calculating an actuating amount of said rotational phase adjusting means, based on a difference between said detected rotational phase difference and a target value and an additional actuating amount for keeping said rotational phase difference at a constant value, to make said detected rotational phase difference equal said target value; and learning means for correcting said additional actuating amount used in said actuating amount computation means, said learning means having a learning characteristic which computes as said additional actuating amount an actuating amount that makes a variation speed representative of a rate of change of said relative rotational phase difference between said crankshaft and said cam shaft zero based on a relationship between said actuating amount of said rotational phase adjustment means and said variation speed of said rotational phase difference, said learning means computing said additional actuating amount by assigning said actuating amount during a predetermined period and variation speed of said rotational phase difference to said learning characteristic, and provides this computed additional actuating amount to said actuating amount computation means.

6. A valve timing control mechanism for an internal combustion engine according to claim 5, wherein:

said learning characteristic provides a deviation based on a relationship between an actuating amount of said rotational phase adjustment means and a rotational phase variation speed of said rotational phase difference;

said deviation is a deviation between an actuating amount which makes said rotational phase variation speed zero and an actuating amount during said predetermined period; and said learning means computes said deviation by assigning an actuating amount during said predetermined period provided by said actuating amount computation means and a variation speed of said rotational phase difference, and computes an additional actuating amount provided to said actuating amount computation means by adding said computed actuating amount back to said predetermined actuating amount.

7. A valve timing control mechanism for an internal combustion engine according to claim 6, wherein said learning means executes a calculation of said learning value on condition that said rotational phase variation speed is within a specified range.

8. A valve timing control mechanism for an internal combustion engine according to claim 5, wherein said learning means comprises:

delaying means for delaying said adjustment amount provided by said actuating amount computation means by a response delay time of said control mechanism and for providing said predetermined period actuating amount;

variation speed operation means for calculating said variation speed from a change in said relative rotational phase difference detected by said rotational phase detection means;

deviation computation means for computing a deviation based on said learning characteristic; and addition means for computing said additional actuating amount provided to said actuating amount computation means by adding said actuating amount during said predetermined period and said computed deviation.

9. A valve timing control mechanism for an internal combustion engine according to claim 8, wherein said learning means calculates said learning value when said variation speed is within a specified range and a variation of a delayed actuating amount is within a specified change for a specified time.

10. A valve timing control mechanism for an internal combustion engine according to claim 5, wherein said learning characteristic is set based on a relationship between said actuating amount and said variation speed at a limited interval where said variation speed is substantially zero.

11. A valve timing control mechanism for an internal combustion engine according to claim 10, wherein said learning characteristic includes a map for determining said additional actuating amount with said variation speed and said actuating amount as selection parameters of said map.

12. A method of controlling a valve timing of an internal combustion engine having a valve timing adjustment mechanism which changes a rotational phase of a cam shaft by varying said valve timing, said valve timing adjustment mechanism adjusting said valve timing in advance and delay directions responsive to an actuating amount and keeping said valve timing fixed when said actuating amount is a predetermined additional actuating amount, said method comprising said steps of:

detecting an actual valve timing;

determining a target timing;

detecting a deviation between said target timing and said actual timing;

learning said additional actuating amount;

performing feedback having predetermined feedback control characteristics for minimizing said deviation and, based on said feedback control characteristics, computing said actuating amount in correspondence with said additional actuating amount which is determined by said learning step and said deviation to provide a predetermined period actuating amount; and outputting said computed actuating amount to said valve timing adjustment mechanism;

wherein said learning step includes retaining said predetermined period actuating amount provided by said feedback step, computing a variation speed representative of a rate of change of said relative rotational phase difference between said crankshaft and said cam shaft when said valve timing adjustment mechanism actuates in response to said predetermined period actuating amount, and computing, using a predetermined learning characteristic, an actuating amount that makes said variation speed zero as said additional actuating amount based on a relationship between said actuating amount and said variation speed, and computing said additional actuating amount by assigning said adjustment amount for said predetermined period and said variation speed to said predetermined learning characteristic.

13. The method of claim 12, wherein said learning characteristic is set based on said relationship between said actuating amount and said variation speed in a limited interval when said variation speed is substantially zero.

14. The method of claim 13, wherein said learning characteristic includes a map for determining said additional actuating amount with said variation speed and said actuating amount as said parameters.

* * * * *